Patented Apr. 19, 1932                                     1,855,119

UNITED STATES PATENT OFFICE

KARL VIEWEG, OF FRANKFORT-ON-THE-MAIN, GERMANY, ASSIGNOR TO DEUTSCHE GOLD & SILBER SCHEIDEANSTALT VORMALS ROESSLER, OF FRANKFORT-ON-THE-MAIN, GERMANY, A CORPORATION

PROCESS FOR THE PREPARATION OF AN α-CHLORO-PYRIDINE

No Drawing. Application filed November 29, 1927, Serial No. 236,586, and in Germany December 3, 1926.

It is already known that an N-alkyl-α-pyridone can be converted into α-chloro-pyridine by treatment with phosphorous pentachloride.

I have now found that it is possible to convert N-alkyl-α-pyridones into α-chloro-pyridine by treating the pyridones with the considerably cheaper compound, phosgene. This reaction takes place at about the same temperature as that required when phosphorous pentachloride is used as the chlorinating agent. The preparation of α-chloro-pyridines by my invention is not only cheaper but is accomplished with much less trouble than by other methods, since the by-products, carbon dioxide and alkyl chloride, may be led off as gases during the reaction. Excellent yields of final product are obtained when using my process.

The following examples will serve to illustrate my invention.

*Examples*

(1) 40 grs. of N-methyl-α-pyridone were put into a flask fitted with a reflux condenser and chlorinated by slowly introducing phosgene at temperatures around 120° C. Under such conditions the reaction material remained liquid, only a few crystals sublimed occasionally in the condenser. After the contents of the flask had attained a weight of about 43 to 45 grs. it was worked up by mixing it with a little caustic soda solution and then steam distilled. There were obtained about 39 grs. of α-chloro-pyridine, which corresponds to a yield of about 93–94%.

I believe the reaction which occurred in this example is substantially as follows:

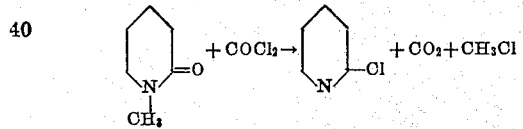

(2) 50 grs. of N-methyl-β'-nitro-α-pyridone were put into a flask fitted with a reflux condenser and chlorinated by slowly introducing phosgene at temperatures of about 130 to 160°. After two hours the chlorination is finished; the weight of mass is about 51 grs. The product is then poured on ice and recrystallized with $CH_3OH$. There were obtained 49 to 50 grs. α-chloro-β'-nitropyridine which corresponds to a yield of about 95–97%.

What I claim is:

1. A process for the preparation of an α-chloro-pyridine comprising chlorinating an N-alkyl-α-pyridone by means of heating with phosgene.

2. A process for the preparation of α-chloro-pyridine comprising chlorinating an N-alkyl-α-pyridone by means of heating with phosgene.

Signed at Frankfort-on-the-Main, Germany, this 7th day of November, A. D. 1927.

KARL VIEWEG.